United States Patent [19]

Woode

[11] 4,018,877
[45] Apr. 19, 1977

[54] PRODUCTION OF CALCIUM CARBONATE
[75] Inventor: Richard Derek Anthony Woode, Runcorn, England
[73] Assignee: Imperial Chemical Industries Limited, London, England
[22] Filed: Feb. 10, 1975
[21] Appl. No.: 548,807
[30] Foreign Application Priority Data
   Feb. 14, 1974   United Kingdom ............... 6686/74
[52] U.S. Cl. ................................. 423/432; 423/165
[51] Int. Cl.$^2$ ........................................ C01F 11/18
[58] Field of Search .......... 423/165, 167, 430, 432, 423/267; 106/306, 308 Q

[56] References Cited
UNITED STATES PATENTS

| | | | |
|---|---|---|---|
| 2,927,091 | 3/1960 | Lissett | 106/306 |
| 3,126,253 | 3/1964 | Podschus | 423/432 |
| 3,133,824 | 5/1964 | Podschus | 423/432 |
| 3,347,624 | 10/1967 | Taylor | 423/432 |
| 3,443,890 | 5/1969 | Sisson | 423/432 |

FOREIGN PATENTS OR APPLICATIONS

| | | | |
|---|---|---|---|
| 4,614,821 | 4/1971 | Japan | 423/430 |
| 897,205 | 5/1962 | United Kingdom | 423/432 |
| 291,875 | 6/1971 | U.S.S.R. | 423/430 |

*Primary Examiner*—Oscar R. Vertiz
*Assistant Examiner*—Gary P. Straub
*Attorney, Agent, or Firm*—Cushman, Darby & Cushman

[57] ABSTRACT

Calcium carbonate is manufactured by the carbonation of an aqueous suspension of calcium hydroxide in the presence of a complex-forming agent for calcium ions which is added subsequently to the primary nucleation stage, and preferably during a first carbonation stage. Optionally there is also added a long-chain fatty acid or long-chain fatty acid salt, preferably after a final carbonation stage.

9 Claims, No Drawings

PRODUCTION OF CALCIUM CARBONATE

This invention relates to the production of calcium carbonate, and especially to the production of precipitated calcium carbonate useful as a filler in paints, plastics and rubber.

In a conventional carbonating procedure, a suspension of calcium hydroxide, known as "milk of lime," and containing typically 30 to 250g $Ca(OH)_2$/liter, is heated to about 25° C and agitated vigorously whilst carbon dioxide is passed into the mixture. The pH of the reaction mixture is initially about 12 and remains so until neutralization approaches completion. A fall in pH near neutrality is noted and carbonation is usually stopped at about pH 8–10. The product is then "aged" by heating at about 80°–90° C to improve uniformity of the crystal size, and during this period the pH rises towards 11–12. It is then usual to restart carbonation to bring the suspension back to pH 7–8 before filtering off the product and drying it. Following the second carbonation stage and before filtering off the product, a long-chain fatty acid or salt thereof is commonly added to reduce the aggregation of small particles of calcium carbonate. This ensures that the resulting calcium carbonate product is easily dispersed in the end use media, for example rubber or plastics.

The most suitable long-chain fatty acids contain from 12 to 20 carbon atoms, and the most commonly used is stearic acid (sometimes used in the form of it ammonium salt). These long-chain fatty acids and their salts are relatively expensive compared with the cost of the other raw materials used in the preparation of the calcium carbonate, and in fact constitute an appreciable proportion of the total raw material cost.

We have now found that all or a part of the long-chain fatty acid or the long-chain fatty acid salt may be replaced by alternative materials without adversely affecting the final calcium carbonate product.

According to the present invention there is provided a process for the manufacture of calcium carbonate which comprises carbonating an aqueous suspension of calcium hydroxide and adding, subsequently to the primary nucleation stage of the calcium carbonate, a complex-forming agent for calcium ions.

By the term "carbonating" used herein, we mean treating with carbon dioxide. The carbon dioxide may be used without admixture of other gases or the carbonating gas may be carbon dioxide in admixture with a diluent gas, for example air or nitrogen.

The aqueous suspension of calcium hydroxide is conveniently obtained by slaking quicklime (obtained for example by burning natural limestone) with water. Alternatively, the aqueous suspension of calcium hydroxide may be obtained by reacting an aqueous solution containing calcium ions with an aqueous solution containing hydroxide ions, for example by reacting an aqueous solution of calcium chloride with sodium hydroxide.

The aqueous suspension of calcium hydroxide may contain impurities derived from the raw materials used in its preparation. Typical impurities include magnesium salts, silicates and aluminates.

By term "primary nucleation stage" we mean the stage during the carbonation of the aqueous suspension of calcium hydroxide at which spontaneous nucleation of calcium carbonate first occurs. This excludes the early stages of the carbonation when either there is no precipitation of calcium carbonate or the precipitation of calcium carbonate is occurring on nuclei of calcium carbonate or other solid matter already present in the aqueous suspension of calcium hydroxide. The onset of the "primary nucleation stage" is generally accompanied by a rapid increase in the rate of precipitation (in terms of weight per unit time) of the calcium carbonate.

The addition of complex-forming agents for calcium ions before the "primary nucleation stage" gives a calcium carbonate product of an undesirably low particle size (for example 0.05 micron or less) and high aggregate content.

The complex-forming agent is preferably added after the bulk of the precipitation of calcium carbonate has occurred. Thus when using a conventional carbonation procedure comprising a first carbonation stage, an ageing stage and a second carbonation stage (as hereinbefore described), the complex-forming agent is preferably added during, and especially towards the end of, the first carbonation stage. It may, however, be added during the subsequent ageing period or in the second carbonation stage.

The complex-forming agent is preferably stable under the carbonation conditions; i.e., it is preferably chemically and thermally stable during carbonation and during conditions normally associated with such carbonation, for example during the ageing stage.

Suitable complex-forming agents which may be used in the process of the invention include hydroxy carboxylic acids, especially hydroxy poly-carboxylic acids (for example citric acid and malic acid) or polyhydroxy carboxylic acids (for example gluconic acid, tartaric acid or 3,4-dihydroxy-benzoic acid) or precursors of said hydroxy acids such as the corresponding lactones (for example gluconolactone); oxyacids, for example oxydiacetic acid; polycarboxylic acids, for example phthalic acid; monosaccharides and polysaccharides, for example glucose and sucrose; polyhydroxy alcohols, for example sorbitol; hydroxy sulphonic acids, for example 4,5-dihydroxy-1,3-disulphonic acid; aminopolycarboxylic acids, for example ethylenediamine tetracetic acid, aminotriacetic acid (nitilotriacetic acid) and aminodiacetic acid (iminodiacetic acid); and polyphosphates, for example sodium hexametaphosphate. It will be understood that acids referred to above may be present as the free acid or a soluble salts, for example alkali metakl or ammonium salts. Mixtures of complex-forming agents may be used if desired.

The proportion of complex-forming agent will vary within wide limits depending on the effectiveness of the particular agent used, but it is generally in the range 0.001 to 5% by weight based on the weight of calcium carbonate produced. For example when citric acid is used as the complex-forming agent, the preferred range is 0.03 to 0.2% by weight based on the weight of the calcium carbonate.

The required amount of complex-forming agent may be added as a single charge or may be added at intervals as a number of discrete smaller charges.

The complex-forming agent may be used in conjunction with a long-chain fatty acid or a salt thereof, for example a long-chain fatty acid or a salt thereof containing 12 to 20 carbon atoms, especially stearic acid or ammonium stearate. When used in conjunction with said long-chain fatty acid or a salt thereof, it is preferred to add the complex-forming agent before adding the fatty acid or fatty acid salt. Preferably the fatty acid or fatty acid salt is added after the final carbonation stage.

When both the complex-forming agent and the fatty acid salt are used, the proportion by weight of fatty acid or fatty acid salt (based on the weight of calcium carbonate produced) may vary over a wide range, for example in the range 0.001–3% but preferably in the range 0.1–2% and especially in the range 0.5–1%.

The concentration of calcium hydroxide in the "Milk of lime" to be carbonated may be varied within wide limits. Calcium hydroxide concentrations within the range most commonly used in conventional carbonating processes (for example 100 to 150g/liter) are preferred, but the process of the present invention may also be used for example at calcium hydroxide concentrations in the range 30 to 250g/liter.

Higher or lower calcium hydroxide concentration may be used if desired.

The invention is illustrated by the following Examples, in which the proportions of complex-forming agent and of stearic acid (when present) are by weight, based on the weight of calcium carbonate precipitated.

EXAMPLE 1

6.75 liters of an aqueous suspension of calcium hydroxide, containing 130g Ca(OH)$_2$/liter were heated to 25° C. The suspension was agitated vigorously and reacted with a mixture of air and carbon dioxide, their individual flow rates being 7.6 liters/min at NTP and 4.9 liters/min at NTP respectively. After 10 minutes (following the "primary nucleation stage") 0.2% of citric acid was added. The carbonation of the suspension was stopped after about a further 50 minutes when the reaction mixture had just become acid to a phenolphthalein indicator. The mixture was then heated slowly to 85° C over a period of about 20 minutes, and was allowed to age, with continued stirring, at 85° C for 30 minutes. Carbonation was then restarted at the much lower rates of 0.38 liter/min at NTP of air and 0.25 liter/min NTP of carbon dioxide. The temperature was maintained at 85° C and after some 20 to 40 minutes the remaining alkalinity was essentially neutralized, for the pH of the batch had fallen below pH 8.0. At this stage 0.8% of stearic acid in ammoniacal solution was added, and the mixture was stirred at 85° C for about 3 hours. The suspension was filtered and the filter cake was extruded through 5/16 inch diameter holes to yield "granules" suitable for drying on a gauze-tray. The extrudates were dried in an oven overnight at 130° C on a gauze-tray.

The hardness of the granules were measured by placing weights on the granules until they collapsed.

A high granule hardness is undesirable since such granules are difficult to mill satisfactorily in the formation of a powder for subsequent dispersion in, for example, paints plastics and rubber. The sample was then ground in a hammer mill so that the properties of the powder (for example texture) could be assessed and the ultimate particle size of the product measured. The texture of the product is conveniently expressed in terms of 'grittiness' or 'softness' of the powder. A 'gritty' powder is one in which hard particles can be detected by rubbing the powder between the fingers and which leaves a significant residue on sieving; a "soft" powder is one in which hard particles cannot be detected by touch and which does not give rise to a residue on sieving. A "soft" powder is more-readily dispersed in, for example, paints, plastics and rubber than is a 'gritty' powder.

The product obtained on the basis of the above tests had a granule hardness of 366 (arbitrary units). For better comparison of results, this value may be converted into a "relative granule hardness" defined as the granule hardness (arbitrary units) of the product divided by the granule hardness (arbitrary units) of granules obtained by a conventional process using the same aqueous suspension of calcium hydroxide, but with 2.6% of stearic acid in ammoniacal solution and with no added complex-forming agent (i.e., the procedure of Comparison 3 given below). This "relative granule hardness" takes account of variations in the physical properties of the calcium hydroxide suspension used as starting material. The "relative granule hardness" of the product of Example 1 was 0.72. The ultimate particle size of the product was 0.07 micron and it has a soft texture.

COMPARISON 1

By way of comparison, the procedure of Example 1 was repeated without the addition of citric acid. The product obtained had a granule hardness of 1027, an ultimate particle size of 0.08 micron and had a gritty texture.

COMPARISON 2

By way of comparison the procedure of Example 1 was repeated except that the citric acid was added to the suspension of calcium hydroxide before it was carbonated. As in example 1, 0.2% citric acid and 0.8% of stearic acid in ammoniacal solution were used. The product obtained has a granule hardness of 1284, an ultimate particle size of 0.05 micron, and had a very gritty texture.

COMPARISON 3

By way of comparison, the procedure of Example 1 was repeated under conditions in which no citric acid was added but using 2.6% of stearic acid (a conventional proportion) in ammoniacal solution. The product obtained had a granule hardness of 544, an ultimate particle size of 0.07 micron, and had a soft texture.

EXAMPLE 2

The carbonation as described in Example 1 was repeated except that the citric acid was added to the suspension immediately after the end of the first carbonation stage. 0.03% of citric acid was added.

The produce obtained had a granule hardness of 516, an ultimate particle size of 0.08 micron, and had a fairly soft texture.

EXAMPLE 3

The carbonation as described in Example 2 was repeated using 0.1% of citric acid.

The product obtained had a granule hardness of 481, an ultimate particle size of 0.07 micron, and had a soft texture.

EXAMPLE 4

The carbonation as described in Example 2 was repeated using 0.2% of citric acid.

The product obtained had a granule hardness of 448, an ultimate particle size of 0.07 micron, and had a soft texture.

EXAMPLE 5

The carbonation as described in Example 1 was repeated except that the citric acid was added to the suspension immediately after the completion of the second carbonation stage and 10 minutes before the addition of the ammoniacal stearic acid. 0.2% of citric acid was added.

The product obtained had a granule hardness of 1144, an ultimate particle size of 0.08 micron, and had a fairly soft texture with a small proportion of grit.

EXAMPLE 6

The carbonation of Example 5 was repeated using 0.5% citric acid.

The product obtained had a granule hardness of 606, an ultimate particle size of 0.08 micron, and had a fairly soft texture.

EXAMPLE 7

The carbonation of Example 4 was repeated in that 0.2% of citric acid was added to the suspension immediately after the end of the first carbonation stage, but without the addition of ammoniacal stearic acid after the second carbonation stage. The extrudates obtained by extruding the filter cake and drying did not remain sufficiently discrete for a granule hardness test to be carried out. The produce had an ultimate particle size of 0.07 micron and had a soft texture.

COMPARISON 4

By way of comparison, the procedure of Example 7 was repeated without the addition of citric acid. The product obtained had a granule hardness of 1544, an ultimate particle size of 0.08 micron, and had a very gritty texture.

EXAMPLE 8

The carbonation as described in Example 2 was repeated except that 0.3% of DL — malic acid was added to the suspension immediately after the end of the first carbonation stage.

The product obtained had a granule hardness of 216, an ultimate particle size of 0.07 micron, and had a soft texture.

EXAMPLE 9

The carbonation as described in Example 2 was repeated using 0.3% of D(+) glucose.

The product obtained had a granule hardness of 348, an ultimate particle size of 0.07 micron, and had a soft texture.

EXAMPLE 10

The carbonation as described in Example 2 was repeated using 0.3% of 1,5-gluconolactone.

The product obtained had a granule hardness of 221, an ultimate particle size of 0.07 micron, and had a soft texture.

EXAMPLE 11

The carbonation as described in Example 2 was repeated using 0.1% of the disodium salt of ethylenediamine tetracetic acid.

The product obtained had a granule hardness of 216, an ultimate particle size of 0.06 micron, and had a very soft texture.

EXAMPLE 12

The carbonation as described in Example 2 was repeated using 0.1% of the ammonium salt of aminotriacetic acid.

The product obtained had a granule hardness of 121, an ultimate particle size of 0.06 micron, and had a very soft texture.

EXAMPLE 13

The carbonation as described in Example 2 was repeated using 0.3% of tartaric acid.

The product had a "relative granule hardness" of 0.35 an ultimate particle size of 0.05 micron and had a soft texture.

EXAMPLE 14

The carbonation as described in Example 2 was repeated using 0.3% of 3,4-dihydroxybenzoic acid.

The product had a "relative granule hardness" of 0.52, an ultimate particle size of 0.06 microns and had a soft texture.

EXAMPLE 15

The carbonation as described in Example 2 was repeated using 1.0% of sucrose.

The product had a "relative granule hardness" of 0.56, an ultimate particle size of 0.08 micron and had a soft texture.

EXAMPLE 16

The carbonation as described in Example 2 was repeated using 0.1% of iminodiacetic acid.

The product has a "relative granule hardness" of 0.77, an ultimate particle size of 0.07 microns and had a soft texture.

EXAMPLE 17

The carbonation as described in Example 2 was repeated using 0.6% of malonic acid.

The product had a "relative granule hardness" of 0.56, an ultimate particle size of 0.06 micron and had a soft texture.

EXAMPLE 18

The carbonation as described in Example 2 was repeated using 0.1% of sodium hexametaphosphate.

The product had a "relative granule hardness" of 0.73, an ultimate particle size of 0.07 microns and had a soft texture.

What we claim is:

1. In a process for the manufacture of calcium carbonate by carbonating an aqueous suspension of calcium hydroxide to produce calcium carbonate and separating the thus formed calcium carbonate, the improvement which comprises adding to the suspension, subsequently to a calcium carbonate primary nucleation stage of the carbonation step and before completion of the carbonation step, a complex-forming agent for calcium ions.

2. A process as claimed in claim 1 in which the process comprises a first carbonation stage, an aging stage, and a subsequent second carbonation stage, and in which the complex-forming agent is added during the first carbonation stage.

3. A process according to claim 2 wherein a long-chain fatty acid or salt thereof is added after the second carbonation stage.

4. A process according to claim 1 wherein the complex-forming agent is a hydroxy polycarboxylic acid.

5. A process according to claim 4 wherein the hydroxy polycarboxylic acid is citric acid.

6. A process according to claim 1 wherein after completion of the carbonation there is added a long-chain fatty acid or a salt thereof.

7. A process according to claim 6 wherein said long-chain fatty acid or salt is stearic acid or ammonium stearate.

8. A process according to claim 6 wherein the proportion of weight of said fatty acid or salt thereof, based on the weight of calcium carbonate produced, is 0.001 to 3 percent.

9. A process according to claim 6 wherein the proportion by weight of said fatty acid or salt thereof, based on the weight of calcium carbonate produced, is 0.5 to 1 percent.

* * * * *